US 9,910,841 B2

United States Patent
Anglin et al.

(10) Patent No.: US 9,910,841 B2
(45) Date of Patent: *Mar. 6, 2018

(54) ANNOTATION DATA GENERATION AND OVERLAY FOR ENHANCING READABILITY ON ELECTRONIC BOOK IMAGE STREAM SERVICE

(71) Applicant: International Business Machines Corporation, Armonk, NY (US)

(72) Inventors: Debbie A. Anglin, Austin, TX (US); Li Ge, Austin, TX (US); Su Liu, Austin, TX (US); Shunguo Yan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/058,254

(22) Filed: Mar. 2, 2016

(65) Prior Publication Data

US 2017/0109337 A1    Apr. 20, 2017

Related U.S. Application Data

(63) Continuation of application No. 14/885,111, filed on Oct. 16, 2015.

(51) Int. Cl.
*G06F 17/00* (2006.01)
*G06F 17/24* (2006.01)
(Continued)

(52) U.S. Cl.
CPC ......... *G06F 17/241* (2013.01); *G06F 17/242* (2013.01); *G06F 17/2785* (2013.01); *G06K 9/4671* (2013.01)

(58) Field of Classification Search
CPC .................................... G06F 17/242
See application file for complete search history.

(56) References Cited

U.S. PATENT DOCUMENTS 7,627,582 B1 * 12/2009 Ershov .............. G06F 17/30864
8,214,734 B2 *  7/2012 Grabarnik ......... G06F 17/30705
                                                  715/230
(Continued)

FOREIGN PATENT DOCUMENTS

CN          1336604 A       11/2011

OTHER PUBLICATIONS

Hsieh, Shu-Kai. "Hanzi, Concept and Computation: A preliminary survey of Chinese Characters as a Knowledge Resource in NLP." PhD diss., Universitat Tubingen, 2006.

(Continued)

*Primary Examiner* — Laurie Ries
(74) *Attorney, Agent, or Firm* — Joseph J. Petrokaitis; Gregory K. Goshorn; Greg Goshorn, P.C.

(57) ABSTRACT

Provided are techniques for receiving a scanned image corresponding to a page; analyzing the scanned image to identify a set of characters (Ci) and corresponding positions (Pi) of each character of Ci on the page; applying natural language processing (NPL) and an analytic analysis algorithm to determine a semantic analysis relationship of phrases formed by Ci to determine meanings for the phrases; generating a plurality of annotations (Ai) indicating the determined meanings of the phrases, wherein each annotation is assigned a corresponding position (Qi) on the page based upon the Pi of the corresponding characters on the page; and storing, in a non-transitory computer-readable medium, the scanned image in conjunction with the plurality of annotations and the corresponding Qi.

7 Claims, 8 Drawing Sheets

(51) Int. Cl.
*G06F 17/27* (2006.01)
*G06K 9/46* (2006.01)

(56) References Cited

U.S. PATENT DOCUMENTS

| | | |
|---|---|---|
| 8,478,787 B2 | 7/2013 | Wu et al. |
| 8,838,432 B2 | 9/2014 | Baker et al. |
| 2003/0050782 A1 | 3/2003 | Zweig et al. |
| 2003/0190145 A1* | 10/2003 | Copperman ...... G06F 17/30017 386/241 |
| 2006/0041564 A1 | 2/2006 | Jain et al. |
| 2007/0271226 A1* | 11/2007 | Zhang ................ G06F 17/30265 |
| 2007/0300142 A1* | 12/2007 | King ...................... G06Q 30/02 382/181 |
| 2008/0052638 A1* | 2/2008 | Frank .................. G06K 9/00476 715/808 |
| 2008/0114782 A1* | 5/2008 | Sadovsky ......... G06F 17/30014 |
| 2009/0263019 A1* | 10/2009 | Tzadok ................ G06K 9/6255 382/176 |
| 2009/0310189 A1* | 12/2009 | Gallagher ............ G06K 9/3208 358/474 |
| 2011/0043652 A1 | 2/2011 | King et al. |
| 2011/0209044 A1 | 8/2011 | Kutsumi et al. |
| 2012/0221936 A1 | 8/2012 | Patterson et al. |
| 2012/0331060 A1* | 12/2012 | Castro ............... H04L 29/06401 709/204 |
| 2013/0191717 A1* | 7/2013 | Grabarnik ......... G06F 17/30705 715/230 |
| 2013/0321456 A1 | 12/2013 | Hultquist et al. |
| 2014/0278360 A1* | 9/2014 | Clark ................ G06F 17/30017 704/9 |
| 2014/0280113 A1* | 9/2014 | Hohwald ........... G06F 17/30268 707/728 |
| 2016/0110471 A1* | 4/2016 | Bagheri ............ G06F 17/30896 707/706 |

OTHER PUBLICATIONS

Rai, Laxmisha, et al;"Jess Based On-Demand Multimedia Player with Data Retrieval and Streaming Service." In Image and Graphics (ICIG), 2013 Seventh International Conference on, pp. 628-633. IEEE, 2013.

Zidouri, "ORAN: a basis for an Arabic OCT system," DOI: 10.1109/ISIMP.2004.1434161, Source: IEEE Xplore, Nov. 2004.

* cited by examiner

TOC WITH SELECTED CONTEXT 450

CHAPTER HEADING 404

| | |
|---|---|
| Chapter 1 | Loomings |
| | Def.: (¶3): spile /spɪl/ noun |
| |     2. a large, heavy timber driven into the ground |
| |     to support a superstructure.    REFERENCE |
| 406 |     (see Chap. 14, ¶2)                     408 |
| 410 | Comment (¶3):    Crowd heads to water. |
| Chapter 2 | The Carpet-Bag |
| Chapter 3 | The Spouter Inn |
| Chapter 4 | The Counterpane |
| Chapter 5 | Breakfast |
| | Highlight: (¶2) lines 1-5 |
| Chapter 6 | The Street |
| Chapter 7 | Chapel                414 |
| Chapter 8 | The Pulpit |
| Chapter 9 | The Sermon |
| Chapter 10 | A Bosom Friend |
| Chapter 11 | Nightgown |
| Chapter 12 | Biographical |
| Chapter 13 | Wheelbarrow |
| Chapter 14 | Nantucket |
| | Def: spile /spɪl/ noun ¶2 |
| |     1. a small wooden peg or spigot for stopping a |
| |     cask.                            REFERENCE |
| 416 |     (see Chap. 1; ¶3)                   418 |
| Chapter 15 | Chowder |

Moby Dick; TOC w/ Context

SOURCE IDENTIFIER 452

ANNOTATION DATA GENERATION AND OVERLAY FOR ENHANCING READABILITY ON ELECTRONIC BOOK IMAGE STREAM SERVICE

CROSS-REFERENCES TO RELATED APPLICATIONS

The present application is a continuation and claims the benefit of the filing date of an application entitled, "Annotation Data Generation and Overlay for Enhancing Readability on Electronic Book Image Stream Service," Ser. No. 14/885,111, filed Oct. 16, 2015, assigned to the assignee of the present application, and herein incorporated by reference.

FIELD OF DISCLOSURE

The claimed subject matter relates generally to techniques for e-book streaming services and, more specifically, to generation and display of annotations in conjunction with displayed images of pages within e-books.

BACKGROUND OF THE INVENTION

Subscription-based streaming services is a big market. In the USA, e-book stream business sales are approximately four (4) billion dollars in 2015 and as much as fifteen (15) billion dollars globally. Google, Inc. of Mountain, Calif. has scanned more than thirty (30) million books for google library; Internet Archive is digitizing ancient East Asia books; Fujitsu, Inc. of Tokyo, Japan is scanning three hundred thousand (300,000) Ancient Chinese books for Shanxi Library and, other digitizing vendors are targeting 2,500,000 ancient Chinese books.

Scanned images may be either delivered directly as an e-book image stream service or converted to textural documents for information processing. Thus, users have options to access scanned images or read converted textual documents through subscribed e-book stream services. Although scanned images of old books can be converted into text using technologies (such as Optical Text Recognition, or "OCR"), in certain cases, the scanned images of the hooks are preferred for their originality and authenticity. For example, historians and archaeologists may prefer to get first hand materials in their original from, i.e., an image, for the purposes of research and study.

SUMMARY

Provided are techniques for receiving a scanned image corresponding to a page; analyzing the scanned image to identify a set of characters (Ci) and corresponding positions (Pi) of each character of Ci on the page; applying natural language processing (NPL) and an analytic analysis algorithm to determine a semantic analysis relationship of phrases formed by Ci to determine meanings for the phrases; generating a plurality of annotations (Ai) indicating the determined meanings of the phrases, wherein each annotation of Ai is assigned a corresponding position (Qi) on the page based upon the Pi of the corresponding characters on the page; and storing, in a non-transitory computer-readable medium, the scanned image in conjunction with the plurality of annotations Ai and the corresponding Qi.

This summary as not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures, in which:

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like and procedural programming languages, such as the "C" programming language or similar programming languages. The computer readable program instructions may execute entirely on the user's computer, partly on the user's computer, as a stand-alone software package, partly on the user's computer and partly on as remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
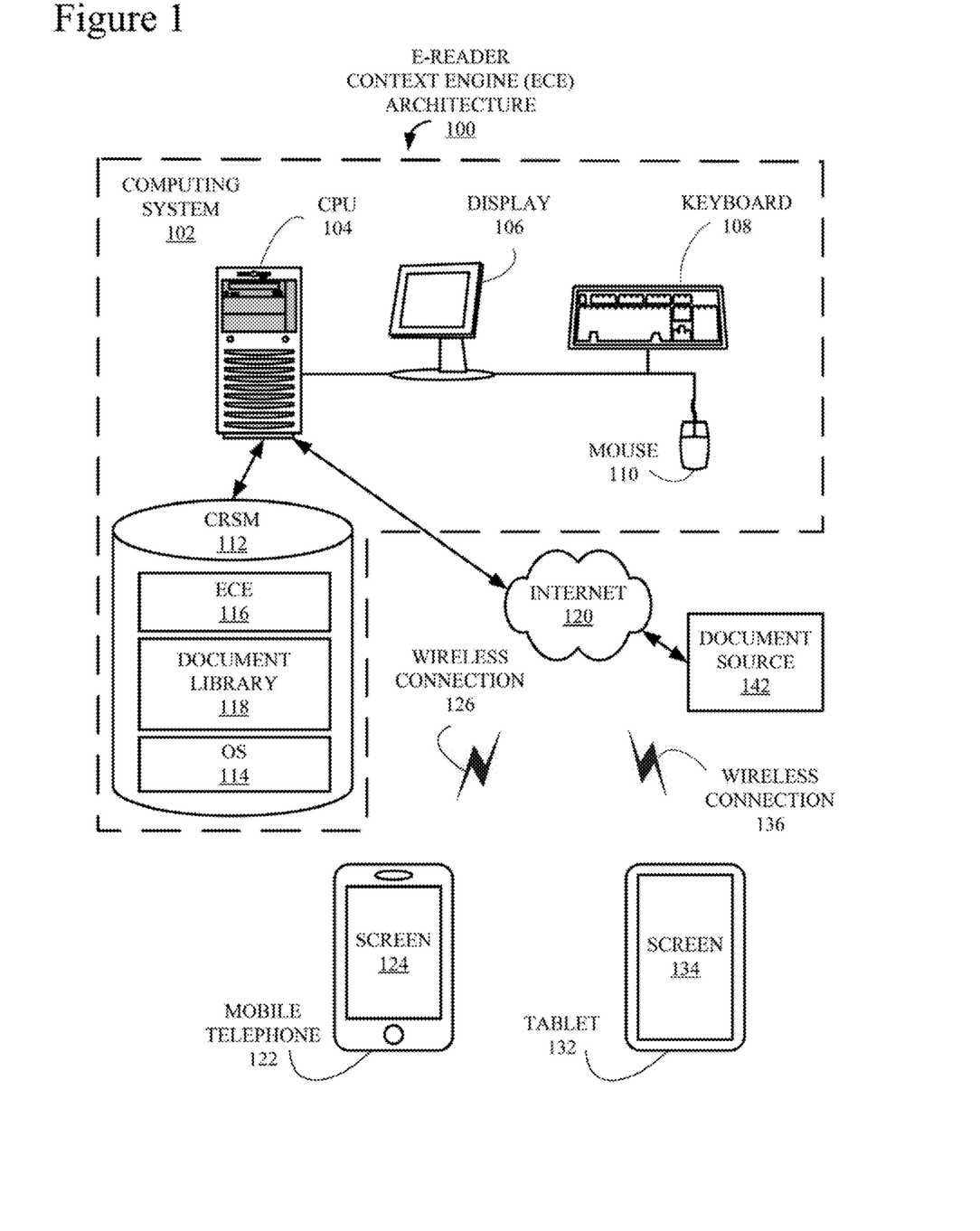
FIG. 1 is one example of a computing system architecture that may implement the claimed subject matter.

Turning now to the figures, FIG. 1 is one example of an Annotation Generation and Overlay (AGO) system architecture 100 that may implement the claimed subject matter. A computing system 102 includes a central processing unit (CPU) 104, coupled to a monitor 106, a keyboard 108 and a pointing device, or "mouse," 110, which together facilitate human interaction with AGO system 100 and computing system 102. Also included in computing system 102 and attached to CPU 104 is a computer-readable storage medium (CRSM) 112, which may either be incorporated into computing system 102 i.e. an internal device, or attached externally to CPU 104 by means of various, commonly available connection devices such as but not limited to, a universal serial bus (USB) port (not shown).

CRSM 112 is illustrated storing an operating system (OS) 114 and an AGO module (AGOM) 116 that incorporates aspects of the claimed subject matter. CRSM 112 also stores an AGO Database (DB) 118 that stores data for the operation and configuration of AGOM 116. AGOM 116 and AGO DB 118 are explained in more detail below in conjunction with FIG. 2-7. In an alternative embodiment, AGO DB 118 may simply he incorporated into AGOM 116 (see 154, FIG. 3).

Computing system 102 is illustrated communicatively coupled to the Internet 130. Also coupled to Internet 130 are a computing device 132 and a mobile telephone 142, which is connected to Internet 130 via a wireless connection 148. Although in this example, computing system 192, computing device 132 and mobile telephone 142 are communicatively coupled via Internet 130, they could also be coupled through any number of communication mediums such as, but not limited to, a local area network (LAN) (not shown) and any other types of connections, both wired and wireless.

Computing device 132 and mobile telephone 142 are used as examples of devices that may take advantage of the claimed subject matter to display annotated, scanned images (see FIG. 6) generated in accordance with the claimed subject matter. To take advantage of the claimed functionality, computing device 132 includes a monitor 136 and mobile telephone 142 includes a screen 146. It should be noted that computing system 102, computing device 132 and mobile telephone 142 would typically include many additional elements but for the sake of simplicity only as few relevant ones are illustrated. Further, it should be noted there are many possible AGO architecture configurations, of which AGO architecture 100 is only one simple example.

Figure 2:
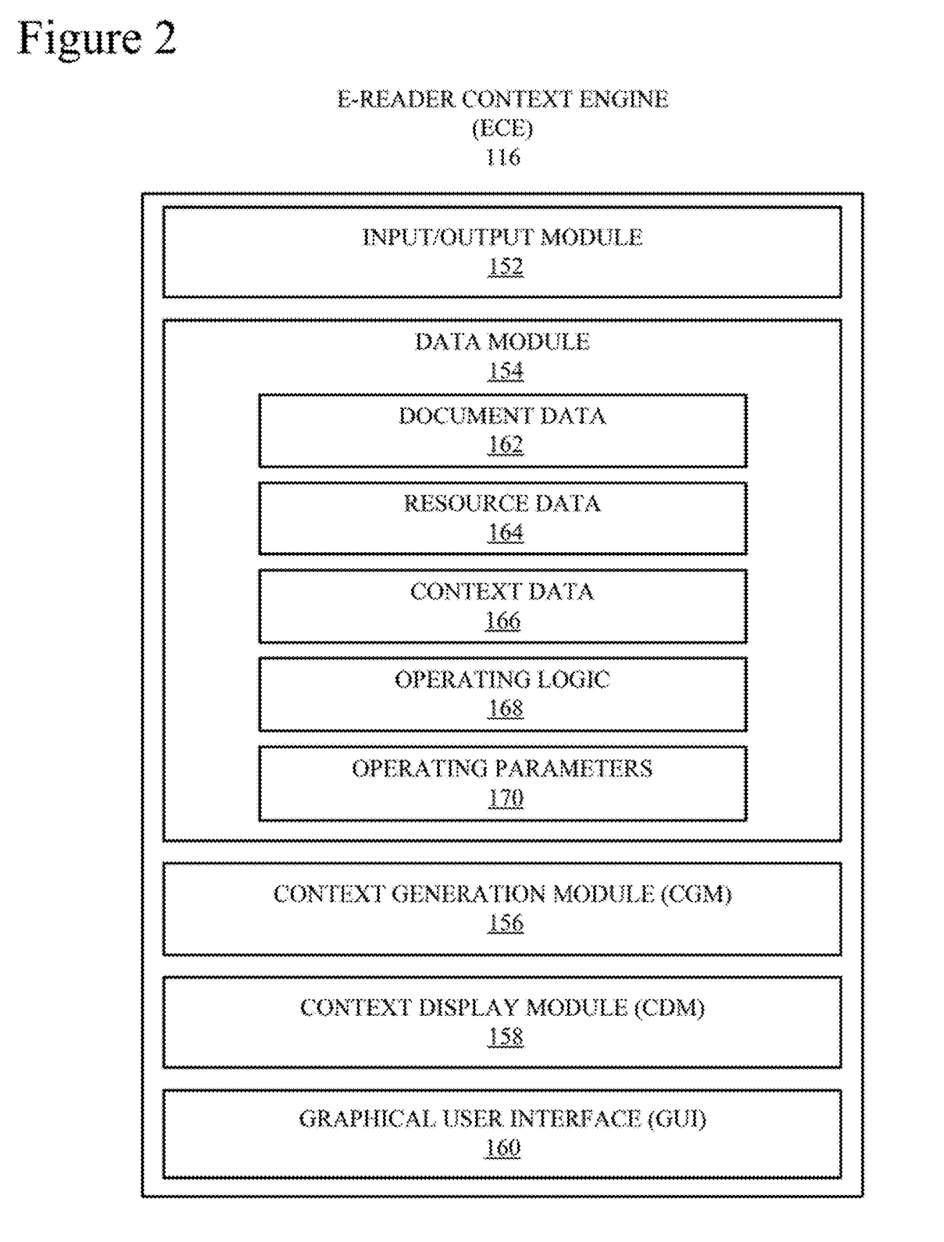
FIG. 2 is a block diagram of an Annotation Generation and Overlay Module (AGOM), first introduced in FIG. 1, in greater detail.

FIG. 2 is a block diagram of Annotation Generation and Overlay Module (AGOM) 116, first introduced in FIG. 1, in greater detail. In this example, logic associated with AGOM 116 is stored on CRSM 112 (FIG. 1) and executed on one or more processors (not shown) of CPU 104 (FIG. 1) and computing system 102 (FIG. 1).

AGOM 116 includes an Input/Output (I/O) module 152, AGO data 154 (shown as a standalone module AGO DB 118 in FIG. 1), a Coordinated Annotation Generator (CAG) 156, a Coordinated Annotation Assistant (CAA) 158 and a graphical user interface (GUI) 160. I/O module 152 handles any communication AGOM 116 has with other components of computing system 102 and architecture 100 (FIG. 1). AGO data 154 is a data repository for information and parameters that AGOM 116 requires during normal operation. Although illustrated as part of AGOM 116, AGO data 154 may also be implemented as a standalone data device (see 118, FIG. 1). Examples of the types of information stored, in data module 154 include a textual DB 162, a Scanned Image (SI) DB 164, a Coordination (Con.) DB 166, a Coordinated Annotation (CA) DB 168, operating logic 170 and operating parameters 172. The use of Textual DB 162, SI DB 164, Con DB 166 and CA DB 168 are explained in more detail below in conjunction with FIGS. 3-8. Operating logic 170 includes executable code for implementing AGOM 116. Operating parameters 172 includes information on various user and administrative preferences and parameters that have been set.

Figure 4:
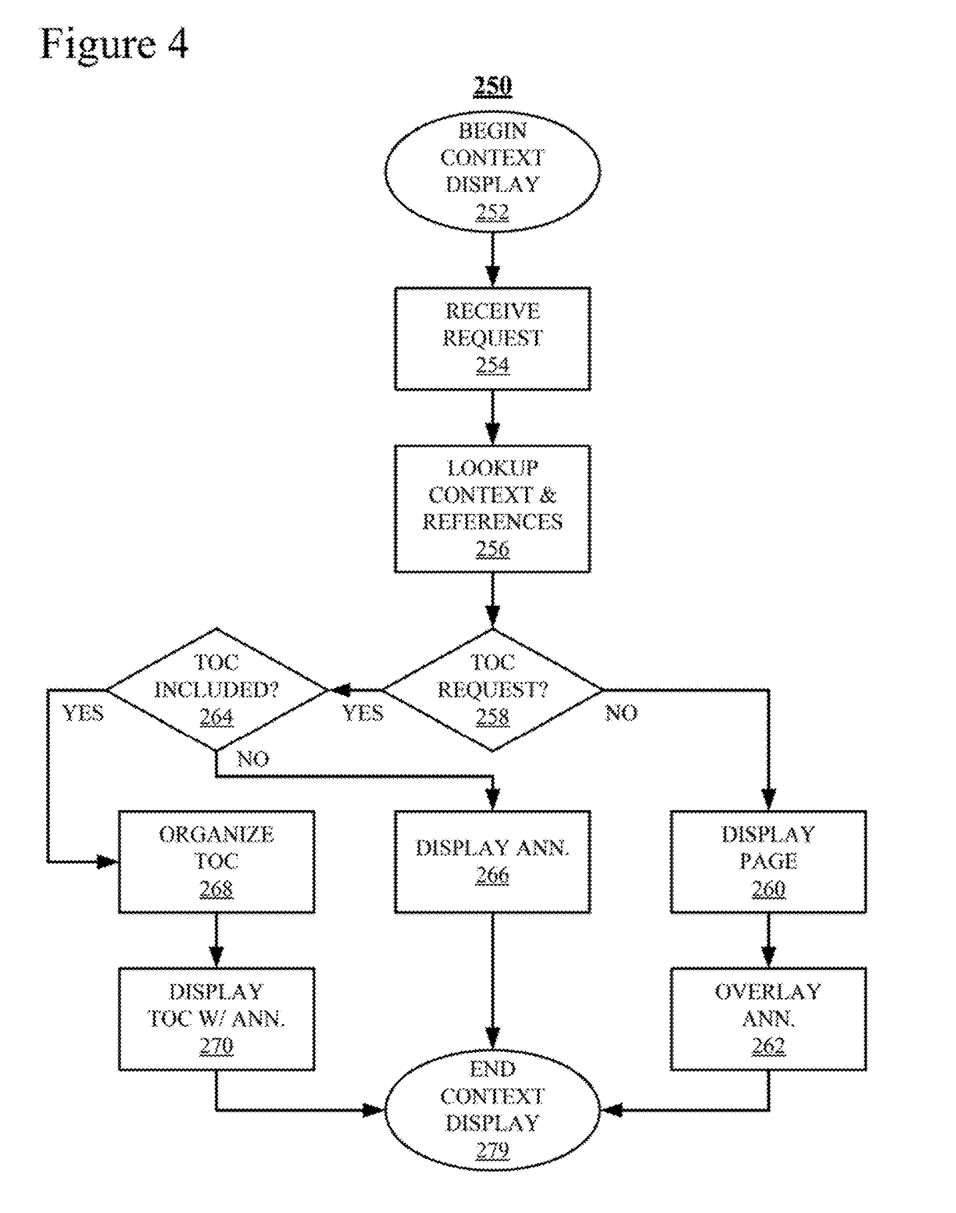
FIG. 4 is a block diagram of a Coordinated Annotation Assistant (CAA), first introduced in FIG. 2, that may implement aspects of the claimed subject matter.
Figure 5:
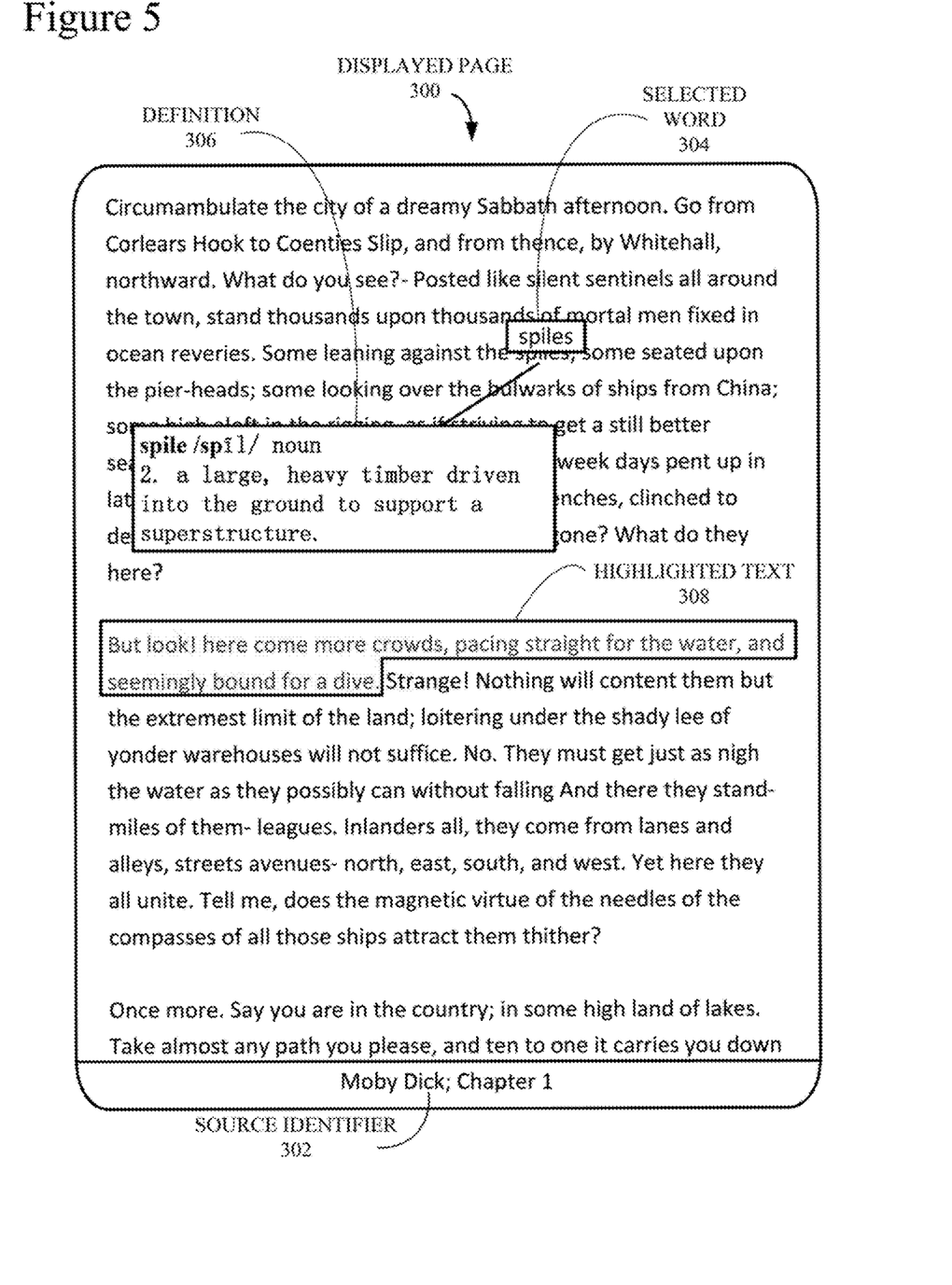
FIG. 5 is a flowchart of one example of a Convert Image process that may implement aspects of the claimed subject matter.

CAG 156 is responsible for the processing of scanned images (see 200, FIG. 5). CAA 158 is responsible for the display and distribution of images processed in accordance with the claimed subject matter (see 250, FIG. 6). Both CAG 156 and CAA 158 are described in greater detail in conjunction with FIGS. 3-7. GUI 160 enables users of AGOM 116 to interact with and to define the desired functionality of AGOM 116.

Figure 3:
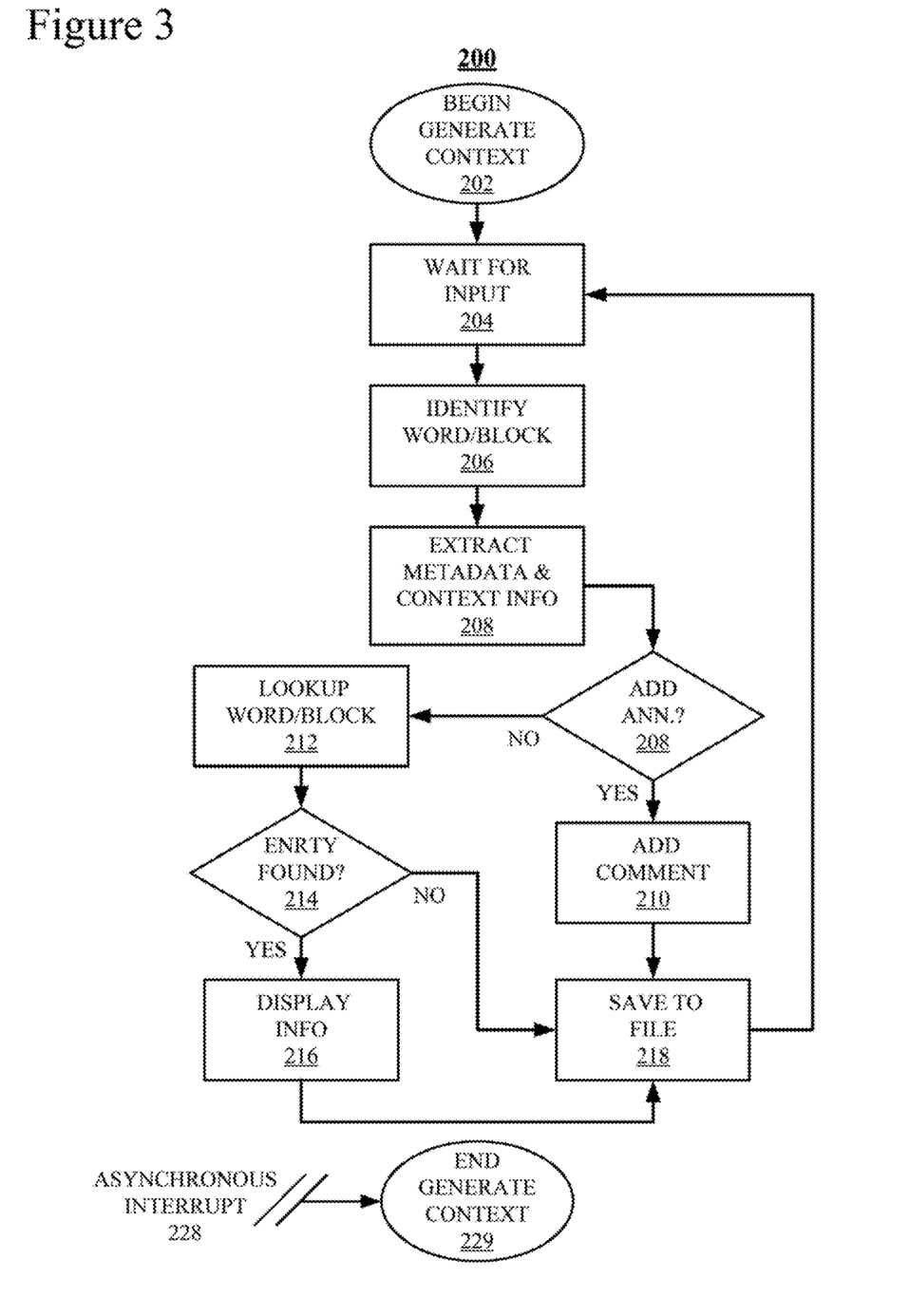
FIG. 3 is a block diagram of a Coordinated Annotation Generator (CAG)), first introduced in FIG. 2, that may implement aspects of the claimed subject matter.

FIG. 3 is a block diagram of Coordinated Annotation Generator (CAG) 156, first introduced in conjunction with FIG. 2, in greater detail. As a component of AGOM 116 (FIGS. 1 and 2), logic associated with CAG 156 is stored on CRSM 112 (FIG. 1) and executed on one or more processors (not shown) of CPU 104 (FIG. 1) and computing system 102 (FIG. 1).

CAG 156 includes an Image Analysis Module (IAM) 182, an Enhanced Optical Character Recognition Framework (EOCRF) 184, a Text Segmentation Module (TSA) 186, a Semantics Computing Module (SCM) 188, an Annotation Generator 190, an Annotation Locator 192 and an Annotation Aligner 194.

IAM 182 is responsible for retrieving an image to be processed and determining relevant information about the retrieved image. For example, IAM 182 determines whether an image being processed has been presented in a vertical or horizontal mode. EOCRF 184 extracts textual information from the retrieved image. In addition to extracting textual information like a typical OCR module. EOCRF 184 characters are located in the image and correlated coordination data is recorded and saved into coordination database 166 (FIG. 2). TSA 186 processes the textual data produced by EOCRF 184 to meaningful phrases within the textual information.

SCM 188 processes the meaningful phrases identified by TSA 186 to extract semantic compositions for annotation generation. Annotation Generator 190 generates annotation corresponding to the textual information based upon the semantic compositions identified by SCM 188. Annotation Generator 190 can process different types of documents differently. For example, some annotations may be related to, but are not limited to, punctuation, ancient script interpretation and footnotes. Annotation generator 190 may be implemented as a standalone, module or as an add-on functionality or a plug-in module of EOCRF 184. In addition, Annotation Generator 190 may either produce metadata for a corresponding image or may produce a transparent overlay for the image containing annotations in appropriate positions as though the annotations are part of the image.

Annotation Locator 192 maps four-corner coordination data to the each character identified by EOCRF 184 so that the data can be used to overlay annotation on the scanned image. Annotation Aligner 194 analyzes the relationship among character location, textual meaning and annotations so that annotations can be precisely aligned with a displayed image (see 300, FIG. 7). Components 182, 184, 186, 188, 190, 192 and 194 are described in more detail below in conjunction with FIGS. 5-8.

FIG. 4 is a block diagram of Coordination Annotation Assistant (CAA) 158, first introduced in conjunction with FIG. 2, that may implement aspects of the claimed subject matter. As a component of AGOM 116 (FIGS. 1 and 2), logic associated with CAA 158 is stored on CRSM 112 (FIG. 1) and executed on one or more processors not shown) of CPU 104 (FIG. 1) and computing system 102 (FIG. 1).

CAA 158 includes an Image Retrieval Module 195, an Annotation Retrieval Module 196, and Image/Annotation (IA) Correlation module 197 and an Overlay module 198. Image Retrieval module 195 is responsible for retrieving an image selected for display by a user. In the following examples, an image is selected by a user who is viewing a documents on either monitor 136 (FIG. 1) or telephone 142 (FIG. 1). The "selection" of an image may be as simple as tuning a page in a multi-page electronic document. It should be understood that processing associated with CAA 158 may be performed in either a batch mode or a page-by-page mode. In other words, when a user downloads a document to telephone 142, processing for all the pages may already be completed, either concurrently with a request or off-line, and the only modified images are actually transmitted to telephone 142 or pages are processed only as they are accessed.

Annotation Retrieval module 196 correlates a particular image with specific annotation data (see 162, FIG. 2) and retrieves the relevant annotation data. IA Correlation module 197 determines the proper position of each datum of the annotation data retrieved by Annotation Retrieval module 196 with the image retrieved by Image Retrieval module 195. Overlay module 198 generates a modified image (see FIG. 8) with the annotation overlaid on the image in appropriate positions as determined by module 197. This modified image is then transmitted to monitor 136 or telephone 142 for display to the user.

FIG. 5 is a flowchart of one example of a Convert Image process 200 that may implement aspects of the claimed subject matter. In this example, process 200 is associated with logic stored on CRSM 112 (FIG. 1) in conjunction with AGOM 116 (FIGS. 1 and 2) and executed on one or more processors (not shown) of computing system 102 (FIG. 1).

Process 200 starts in a "Begin Convert Image" block 202 and proceeds immediately to a "Receive Image" block 204. During processing associated with block 204, an image is received for processing. Typically, a document to be processed may he associated with many images such as an image for each page. Process 200 is described in terms of processing images one at a time although such processing would typically he performed in batches. In addition such processing may be performed on demand or in advance to make certain documents available more quickly. Once an image has been received for processing, control proceeds to an "Analyze Image" block 206. During processing associated with block 206, the image received during processing associated with block 204 is examined as a whole. In other words, the document is scanned to determine the size and orientation of the image and coordinates of the edges. During processing associated with a "Set Coordinates" block 208, information identifying the size, orientation and outline of the image is saved in SI DB 164 (FIG. 2).

During processing associated with a "Get Line" block 210, optical character recognition (OCR) technology is employed to determine a line of text in the image, in this example starting at the top of the image and working down. Once a line of text has been identified, a first character in the line is identified in the image, in this example starting at the left and working to the right. Although the following example is described as a top-to-down and left-to-right process, it should be understood that, depending upon the type of image, some character sets are read and thus processed in a different manner. For example, some documents are typically read from right-to-left or bottom-to-top.

During processing associated with a "Get Next Character (Char.)" block 212, an unprocessed character in the line retrieved during processing associated with block 210 is identified for processing. During processing associated with a "Convert Character (Char.)" block 214, the image of the character identified during processing associated with block 212 is analyzed to determine a textual equivalent. In addition, information identifying a position, or coordinate, of the character within the image is generated. During processing associated with a "Save to Buffer" block 216, the textual equivalent and position information of the character are stored in a temporary buffer (not shown).

During processing associated with a "More Char.?" block 218, a determination is made as to whether or not the line identified during processing associated with block 210 has any unprocessed, or converted, characters. If so, control returns to Get Char. block 212, the next unprocessed character is identified and processing continues as described above. If a determination is made that there are no addition characters, control proceeds to a "More Lines?" block 220. During processing associated with block 220, as determination is made as to whether or not there are any additional, unprocessed lines in the image. If so, control returns to Get Line block 210, the next line is identified and processing continues as described above.

If, during processing associated with block 220, a determination is made that there are no unprocessed lines, control proceeds to a "Save Buffer" block 222. During processing associated with block 222, information in the temporary buffer (see 216) is stored in textual DB 162 (FIG. 2) and Con. DB 166 (FIG. 2) for further processing. Finally, once the temporary buffer has been saved, control proceeds to an "End Convert Image" block in which process 200 is complete.

Figure 6:
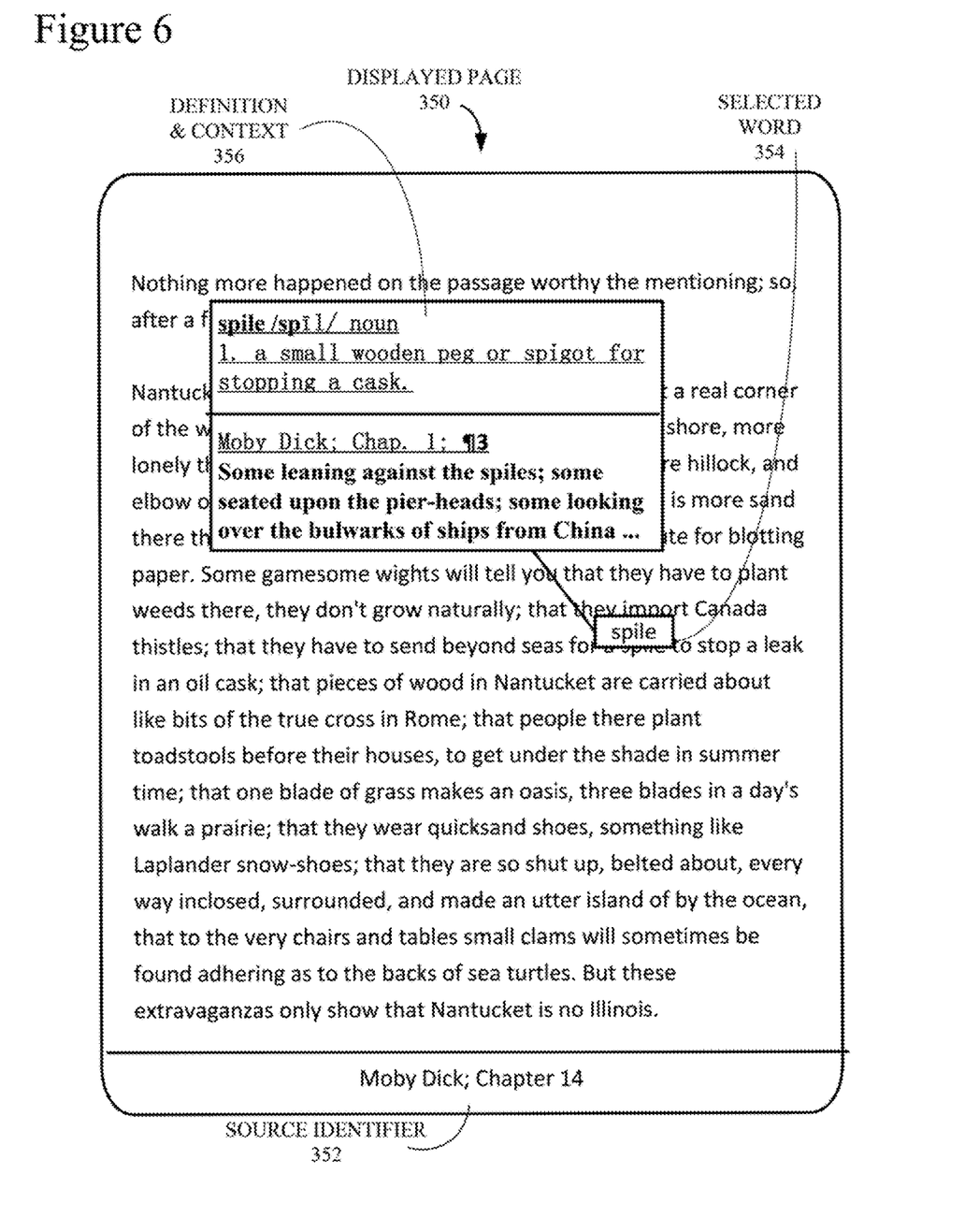
FIG. 6 is a flowchart of one example of a Generate Annotations process that may implement aspects of the claimed subject matter.

FIG. 6 is a flowchart of one example of a Generate Annotations process 250 that may implement aspects of the claimed subject matter. In this example, like process 200, process 250 is associated with logic stored on CRSM 112 (FIG. 1) in conjunction with AGOM 116 (FIGS. 1 and 2) and executed on one or more processors (not shown) of computing system 102 (FIG. 1).

Process 250 starts in a "Begin Generate Annotations" block 252 and proceeds immediately to a "Receive Processed Image" block 254. During processing associated with block 254, an image processed in accordance with process 200 (FIG. 5) is retrieved from SI DB 164 (FIG. 2) along with corresponding textual information from textual DB 162 (FIG. 2), During processing associated with a "Segment Text" block 256, the image and corresponding data received during processing associated with block 254 are analyzed by TSA 186 (FIG. 3) to identify "meaningful phrases." It should be understood that the identification of meaningful phrases is typically language dependent and there are a number of commercially available different segmentation algorithms front which to choose. During processing associated with a "Get Next Segment" block 256, an unprocessed segment identified during processing associated with block 254 is identified for processing.

During processing associated with a "Process Text Semantically" block 258, the segment identified during processing associated with block 256 is analyzed by SCM 188 (FIG. 3) to generate meaningful information, or semantic compositions, related to the segment. Examples such information includes, but is not limited to, translations, references to other works, explanations and so on. During processing associated with a "Generate Annotations" block 260, the semantic compositions generated during processing associated with block 258 are converted into annotations (see 190, FIG. 3) that may be displayed on the image received during processing associated with block 254. During processing associated with a "Locate Annotations" block 262, appropriate positions for the annotations generated during processing associated with block 260 are calculated by IA Correlation module 197 (FIG. 4). The annotations are then aligned with the image in during processing associated with an "Align Annotations" block 264. It should he understood that there are different possible styles for the positioning and alignment of annotations, all of which may be presented in accordance with the claimed subject matter, depending upon the configuration desired for any particular document. For example, annotations may be presented within the text or a document or at the bottom of a page.

During processing associated with a "More Segments?" block 268, a determination is made as to whether or not there are additional, unprocessed segments in the image received during processing associated with block 254. If so, control returns to Get Next Segment block 256, another segment is identified for processing and processing continues as described above. If there are not addition, unprocessed segments, control proceeds to a "Save Information" block 270 during which the information generated during processing associated with blocks 256, 258 260, 262, 263 and 266 is saved to the appropriate data storages in AGO Data 154 (FIG. 2). Finally, control proceeds to an "End Generate Annotations" block 279 during which process 250 is complete.

Figure 7:
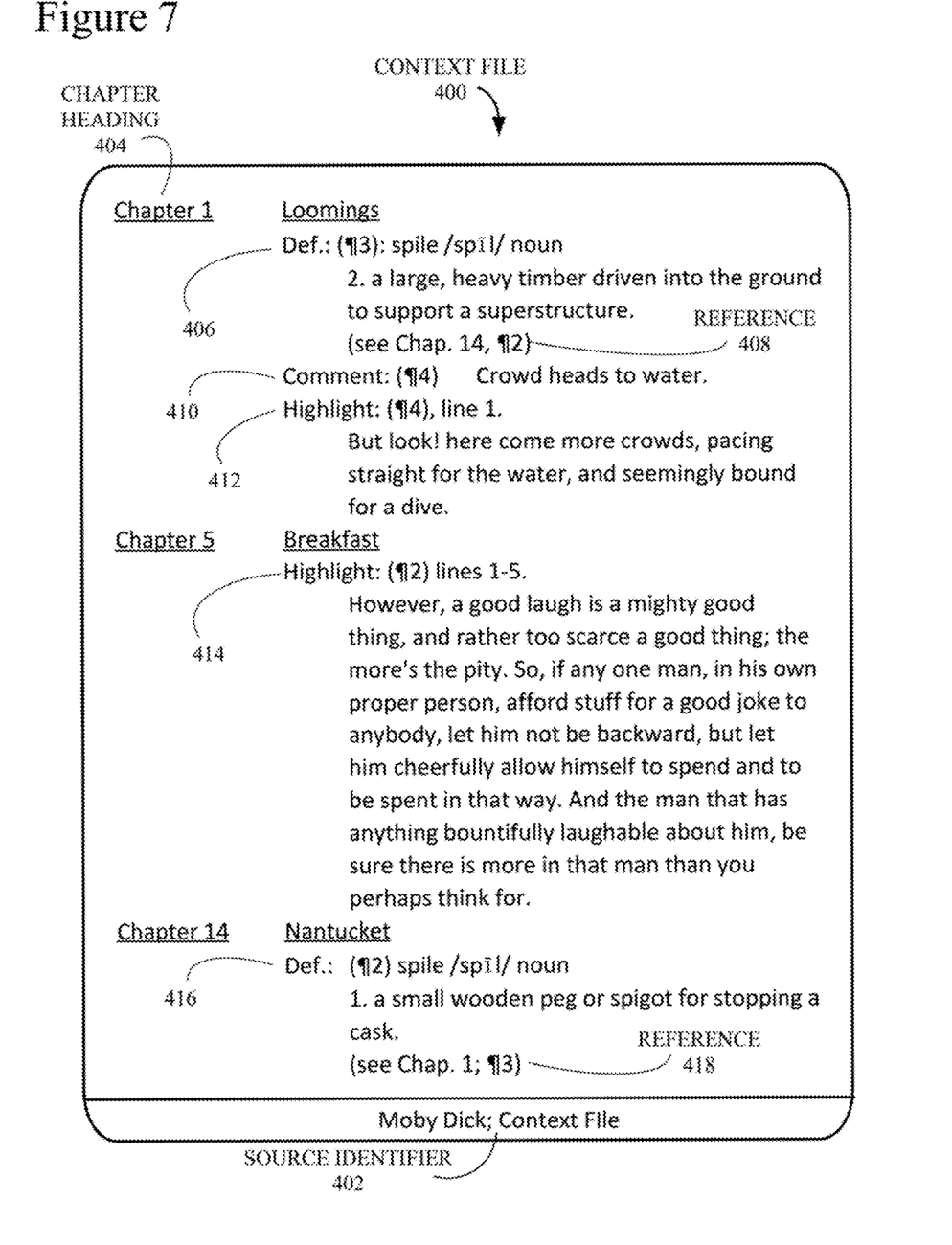
FIG. 7 is a flowchart of a Generate Image process that may implement aspects of the claimed subject matter.

FIG. 7 is a flowchart of a Generate Image process 300 that may implement aspects of the claimed subject matter. In this example, like processes 250 and process 300, process 300 is associated with logic stored on CRSM 112 (FIG. 1) in conjunction with AGOM 116 (FIGS. 1 and 2) and executed on one or more processors (not shown) of computing system 102 (FIG. 1).

Process 300 starts in a "Begin Generate Image" block 302 and proceeds immediately to a "Retrieve Image" block 304. During processing associated with block 304, an image requested by, in this example, computing device 132 (FIG. 1) or mobile telephone 142 (FIG. 1) for display in accordance with the claimed subject matter is retrieved from SI DB 164 (FIG. 2). During processing associated with a "Retrieve Annotations" block 306, annotations corresponding to the image retrieved during processing associated with block 304 (see 190, FIG. 3; 260, FIG. 6) are retrieved from Con. DB 166 (FIG. 2). During processing associated with a "Correlate Annotations (Ann.) to Image" block 308, the annotations retrieved during processing associated with block 306 and the image retrieved during processing associated with block 304 are coordinated with respect to the text within the image from textual DB 162 (FIG. 2).

During processing associated with a "Position Annotations" block 310, the annotations are positioned with respect to the image. As explained above in conjunction with FIG. 6, annotations may be placed in different positions depending upon a desired configuration. During processing associated with an "Overlay Annotations" block 312, the annotations and the image are combined. This may be accomplished either by modifying the image to include the annotations or by generating a transparent overlay that includes the annotations for placement over the image.

During processing associated with a "Transmit image with Annotations" block 314, the image or image and overlay generated during processing associated with block 312 is transmitted for display to the device, such as telephone 142, that requested the image. Finally, control proceeds to an "End Generate Image" block 319 during which process 300 is complete.

Figure 8:
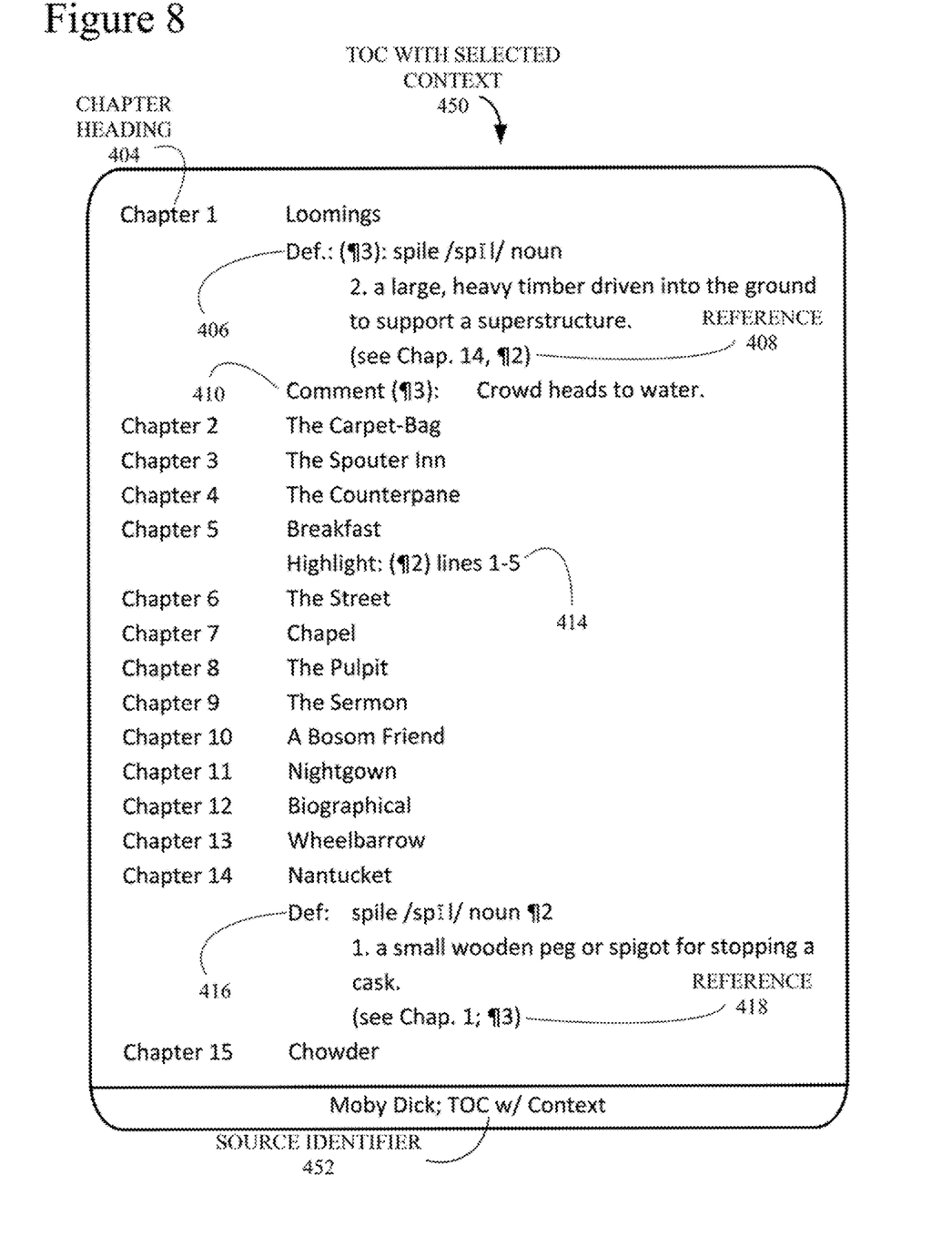
FIG. 8 is an example of a scanned image with annotations generated in accordance with the disclosed technology.

FIG. 8 is an example of a scanned image with annotations 350 generated in accordance with the disclosed technology. In this example, image 350 is displayed on screen 146 (FIG. 1) of mobile telephone 142 (FIG. 1). The scanned image is composed of a number of minimum character/word/phrase blocks, hereinafter simply referred to a "characters" for the sake of simplicity, organized into rows and columns and represented as "C_1_01," "C_2_01," and so on. In should be understood that the illustrated characters in FIG. 8 are meta-characters that represent the any of many different character/word/phrase blocks that may be in a scanned document. The first number in each meta-character, e.g., the '1' in "C_1_01," represents the column and the second numbers, e.g., the "01," represent the row. For the sake of simplicity, only the first row 352 and the first column 354 are labeled. For example, the meta-character "C_3_13" represents a character in the third ($3^{rd}$) column and the thirteenth ($13^{th}$) row. It should be understood this particular notation is being employed to represent any actual characters that may be within a scanned document. It should be noted that the column and row may be, but are not limited to, either character based row and column index, such as in Chinese, Japanese, Latin, and Cyrillic scripts, or pure coordinator system for composing word and phrase blocks, such as in Arabic, Urdu and Indic. Further, it should be noted that the claimed subject matter covers all languages and layout cases. In some languages, such as Arabic and Urdu, "characters" may be connected even when typewritten and may have multiple different shapes according to their position in a word.

Actual characters may be letters that form words in languages such as English or Russian or characters found in languages such as Arabic, Chinese or Japanese that represent entire words or phrases. In addition, although described as organized from right-left and then top-to-bottom, other character sets may be organized in a different fashion. The examples provided should not limit the languages or types of characters that might be found in a scanned document.

In addition to the characters in a particular scanned document. FIG. 8 also illustrates annotation generated in accordance with the claimed subject matter. In this example, a word or phrase represented by the meta-characters "C_2_02" and "C_3_02" are enclosed in a pair of brackets, i.e., a left_double_angle_bracket 356 and a right_double_angle_bracket 358. Brackets 356 and 358 indicate that the enclosed word or phrase has a corresponding annotation that may be viewed by positioning a pointing device, such as mouse 110 (FIG. 1), within brackets 356 and 358 and "clicking" mouse 110. The choice of brackets to enclose characters is arbitrary and does not affect the scope of the claimed subject matter. Punctuation mark, or exclamation mark '!' mark 360, and periods, or '.' 362 and 370 and a comma, or ',' 368 are also illustrated. There are also an additional pair of brackets 364 and 366. The choice of specific punctuation marks is typically dependent upon a particular language or character set and the ones illustrated are merely used for explanatory purposes.

As explained above in conjunction with FIGS. 1-7, annotations 356, 358, 360, 362, 364, 366, 368 and 370, which have been generated in accordance with the disclosed technology, are either placed into the scanned image represented by characters C_01_01, C_2-01 through C_5_18 or placed in a transparent overlay and displayed in conjunction with the scanned image.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the firm disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. A method, comprising:

receiving a scanned image corresponding to a page of text;

analyzing the scanned image to identify a set of characters (Ci) and corresponding positions (Pi) of each character of Ci on the page;

applying natural language processing (NPL) and an analytic analysis algorithm to determine a semantic analysis relationship of phrases formed within Ci and to determine meanings for the phrases;

generating annotation data for each phrase based upon the meanings;

generating a plurality of annotations (Ai), each Ai corresponding to a corresponding phrase and the corresponding phrase's annotation data, wherein each annotation of Ai is assigned a corresponding position Qi on the page based upon the Pi of the corresponding characters on the page;

storing, in a non-transitory computer-readable medium, the scanned image in conjunction with the plurality of annotations, annotation data and the corresponding Qi; and displaying the scanned page in conjunction with the annotations, wherein each annotation is displayed at the corresponding position.

2. The method of claim 1, further comprising:

generating an overlay comprising the plurality of annotations, each annotation at the corresponding Qi; and transmitting, to a display device for display on the display device, the scanned image and the overlay.

3. The method of claim 1, the displaying comprising:

superimposing the plurality of annotations on the scanned image, each annotation at the corresponding Qi, to produce a modified scanned image; and transmitting, to a display device for display on the display device, the modified scanned image.

4. The method of claim 1, wherein the annotations are punctuation corresponding to textual content of the scanned image.

5. The method of claim 1, wherein tie annotation data is reference notes corresponding to the phrases.

6. The method of claim 1, wherein each characters of Ci represents a letter.

7. The method of claim 1, wherein each character of Ci represents a word.

* * * * *